Figure 11:
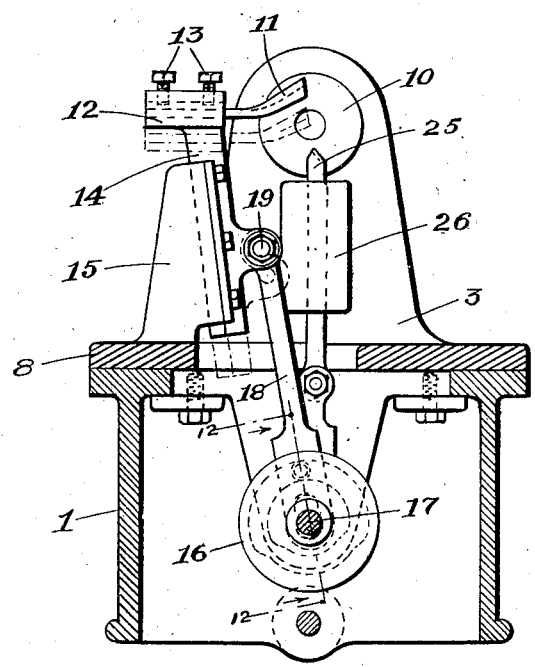

April 1, 1924.
C. F. POTTER
AUTOMATIC WOOD TURNING LATHE
Filed Feb. 19, 1923   3 Sheets-Sheet 1
1,488,895
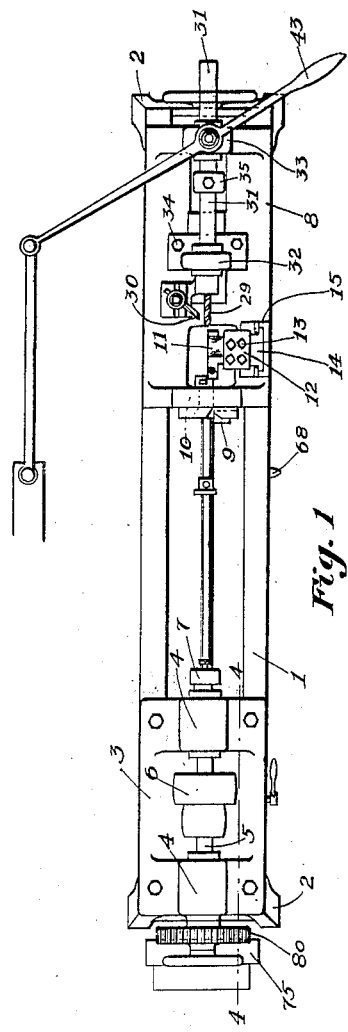
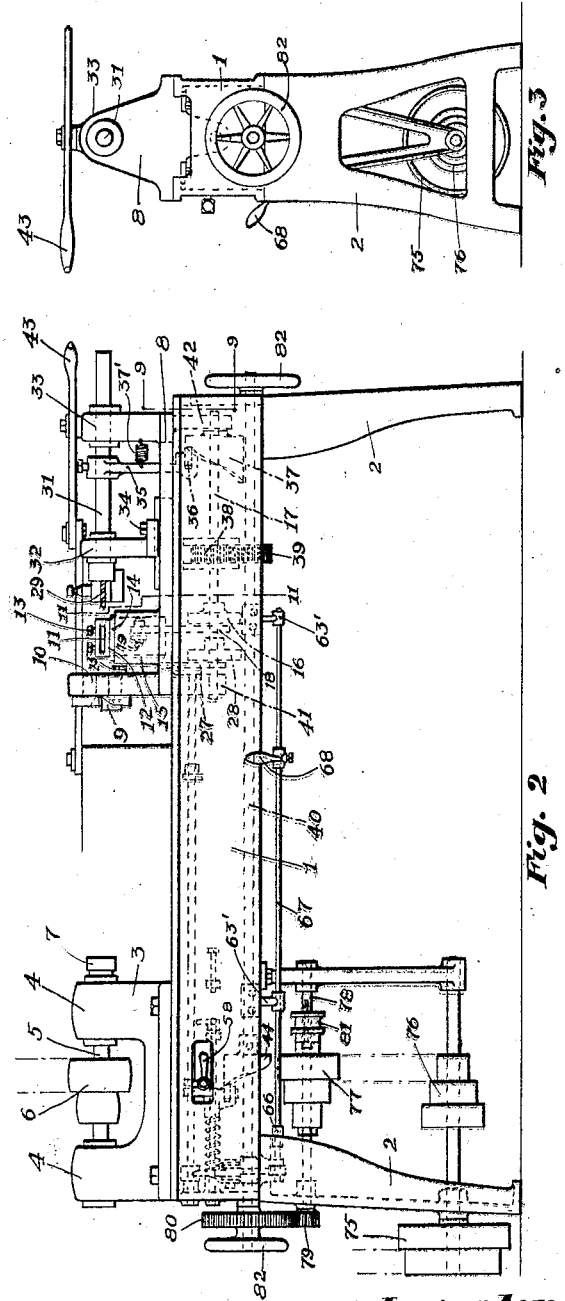
Inventor:
Charles F. Potter

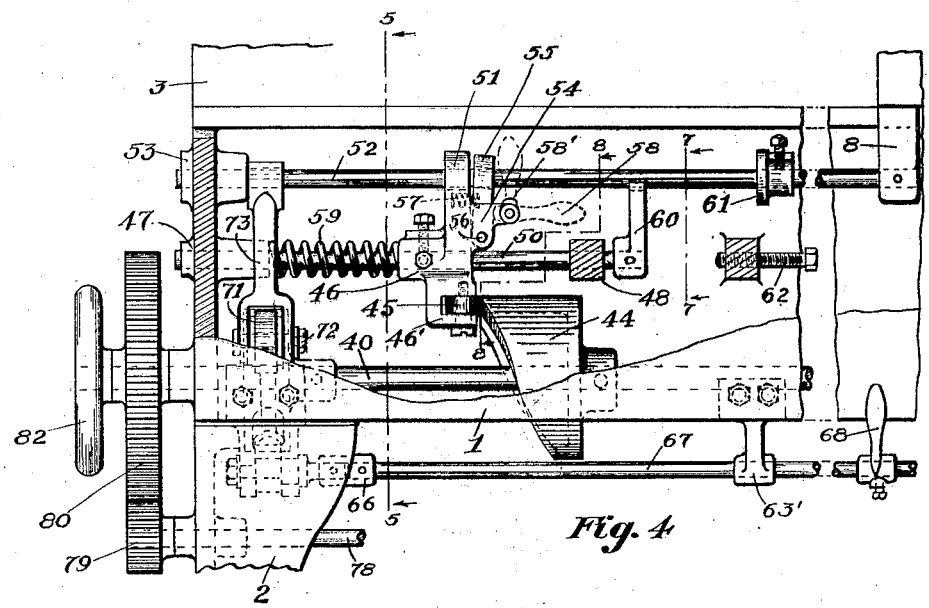

April 1, 1924.

C. F. POTTER 1,488,895

AUTOMATIC WOOD TURNING LATHE

Filed Feb. 19, 1923   3 Sheets-Sheet 3

Inventor:
Charles F. Potter.

Patented Apr. 1, 1924.

1,488,895

UNITED STATES PATENT OFFICE.

CHARLES F. POTTER, OF EUSTIS, MAINE.

AUTOMATIC WOOD-TURNING LATHE.

Application filed February 19, 1923. Serial No. 619,898.

*To all whom it may concern:*

Be it known that I, CHARLES F. POTTER, a citizen of the United States, residing at Eustis, in the county of Franklin and State of Maine, have invented new and useful Improvements in Automatic Wood-Turning Lathes, of which the following is a specification.

My invention relates to certain novel features in the design and construction of a machine which is used for the purpose of turning or shaping articles of wood, such as handles, cylindrical boxes, mailing cases and products of like character.

The machine is intended to do the work automatically after the operator has first placed a square bolt of wood in the chuck and centering mechanism, and the only manual effort required, after all the turning has been completed on the square bolt,—except throwing the feed in and out of action, is to return the carriage to its original position on the bed of the lathe,—in which position another bolt may be inserted.

It has frequently been the practice in building lathes to do this class of work to provide a movable head-stock carrying the chuck spindle, and mounted on the forward part of the bed, and a stationary carriage equipped with the turning and drilling tools on the rearward end of same.

I have chosen to reverse this method of operating and rigidly secure the head-stock to the bed of the lathe, and move, or as is usually expressed, "feed," the carriage, with all turning and cutting tools mounted thereon, forward toward the chuck, the movement being intermittent and occurring after each individual turning from the whole bolt has been completed,—it usually being the case that the original bolt placed in the lathe is of sufficient length to make several of the finished pieces being manufactured.

I have also made an attempt to improve over the feeding mechanism quite generally employed, which requires numerous racks, notched to provide the proper length of each feed,—each different length of the finished piece being turned,—or to speak colloquially, "each job being run through," necessitating the use of a particular rack to match the length of the finished turning.

In my lathe I employ one feed-shaft, frictionally operated and provide means to adjust the feed for different lengths of finished turnings. I mount all cams, required to operate the turning tools, on the movable carriage and thereby make this part of the machine very compact and self-contained.

Further along in this specification I will describe the functions of all parts entering into the construction of my lathe, and in the appended claims point out specifically the novel features pertaining thereto.

Figures 12, 13:
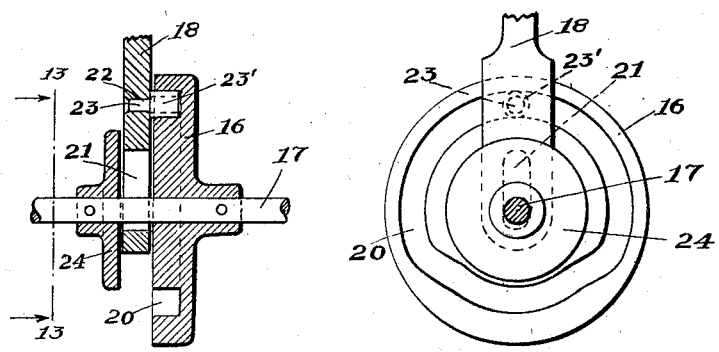

In the drawing accompanying this specification Fig. 1 is a plan view of my automatic wood-turning lathe; Fig. 2 is a side elevation, and Fig. 3 an end elevation of same; Fig. 4 is a fragmentary side elevation, partly in section, of the principal parts comprising the feeding, carriage-stop and carriage-lock mechanisms, the section being taken through the bed of the lathe on line 4—4, Fig. 1, (the head-stock not being shown); Fig. 5 is a cross sectional view through the bed, showing the carriage-lock mechanism,—section being taken on line 5—5, Fig. 4; Fig. 6 is a detail of the joint in the toggle combination shown in Fig. 5; Fig. 7 is an end view of the carriage-stop abutment, the feed-shaft showing in section and viewed from line 7—7, Fig. 4; Fig. 8 is a sectional view through the bed taken on broken line 8—8, Fig. 4, and shows the end view of the feeding mechanism; Fig. 9 is an end view of the lower portion of the carriage showing one of the cam shaft bearings, the section being taken through the bed on line 9—9, Fig. 2; Fig. 10 is a section of the eccentric-pin connection of the carriage-lock toggle levers, the section being taken on line 10—10, Fig. 5; Fig. 11 is a sectional elevation through the bed at broken line 11—11, Fig. 2, showing the turning tool mounted in a slide, and also showing the cutting-off tool; Fig. 12 is a sectional view of the cam and its contiguous connections which actuate the slide for the turning tool the section being taken on line 12—12, Fig. 11, and Fig. 13 is a side elevation of the same parts viewed from a position as at line 13—13, Fig. 12.

Similar numerals refer to similar parts throughout the several views of the drawings.

In Figs. 1 and 2, 1 represents the bed of the lathe, 2, 2 are the legs supporting the bed, 3 is the head-stock, rigidly mounted on the forward part of the bed, and having bearings 4, 4, in which rotates the spindle 5, driven by a belt over pulley 6, the power being taken from any suitable source. On the inner end of the spindle 5 is a chuck 7 in which one end of the square bolt of wood is inserted, and by which the latter gets its rotary movement during the turning operation.

On the opposite end of the bed is a carriage 8, slidably mounted on and gibbed to the former, and adapted to be moved along the bed by either power feed or manual means. On the inner end of the carriage is a roughing tool 9 which turns the square bolt into a round dowel. This operation takes place as the carriage is moved forward toward the chuck and the roughing tool passes along the square bolt,—the turned portion entering a guide ring, generally called, and hereinafter to be referred to as a die, 10.

After one cycle of the feed mechanism the carriage will have been moved forward sufficiently to have allowed a length of rough turned dowel to protrude through the die 10 of approximately the length of one of the pieces to be manufactured. This extended portion is then acted upon by the finishing cutter 11, secured in the cuter holder 12 by screws 13. This holder forms a part of a slide member 14, operating in a gibbed saddle 15, the latter either rigidly secured to, or made an integral part of, the carriage 8.

A cam 16, rigidly mounted on a shaft 17, together with a rod 18 connecting the cam by means of the pin 19, with the slide 14, actuates the latter and brings the turning tool onto and off the dowel. Figs. 12 and 13 illustrate one application of a cam actuating mechanism, which I may adopt, although I do not confine myself strictly to this particular design. The cam 16 has a path 20 cut in its side. Adjacent to this side is a cam rod 18 (previously referred to) with a slot 21 enclosing the shaft 17. At a fixed point, 22, above this slot in the rod, is a pin 23 rigidly secured to the rod and having its inner end projecting out from the rod and into the path 20 of the cam and with a roller sleeve 23′ rotatably mounted thereon. A flanged collar 24 is secured to the shaft 17 to confine the rod 18 between the collar and the cam.

Subsequent to the completion of the turning operation the cutting-off tool 25, adapted to reciprocate in the guide 26 by the action of the cam lever 27 and the cam 28 severs the finished piece from the remaining portion of the dowel.

During the turning operation, or in some cases just preceding it, the boring tool 29 and the tenoning tool 30 perform their duties. These tools are mounted on a tail stock spindle 31, slidable, but not rotatable, in bearings 32 and 33, the former being independently secured to the carriage base by screws 34, 34, and adapted to be adjusted forwardly or backwardly thereon, as occasion may require. An arm 35, adjustably attached to the spindle 31, terminates in a forked end holding a roll 36 which impinges on a cam 37, the latter rigidly secured to the shaft 17. This cam, 37, furnishes the means for moving the spindle 31 forwardly, and the spring 37′ returns the spindle to its rearward position. Also rigidly secured to the shaft 17 is a gear 38 meshing with a gear 39 which revolves with and slides along the main drive shaft 40. These two gears are of the same pitch diameter, and in consequence all rotatable movements of the several cams on the shafts 17 and 40 are synchronous.

Beneath the forward and rearward ends of the carriage 8, and integral therewith, are bearings 41 and 42 which carry the shaft 17. As the carriage is moved along the bed of the lathe all of the cams mounted on the shaft 17 move with it, and to insure continuous meshing of the gears 38 and 39 the former is provided with shrouds which straddle the gear 39 and move it forwardly or backwardly along the shaft 40, and a key staked into the bore of the gear 39 and moving in a key-way in the shaft 40 serves as the driving means for all cams on the shaft 17.

A hand-feed lever 43, which may be fulcrumed from some point outside the lathe, provides means for moving the carriage manually.

Referring to Fig. 4, 44 is a cam secured to the main drive shaft 40. Impinging on this cam is a roll 45 held in the forked portion 46′ of the feed-block casting 46. In suitable bearings, 47 and 48 is journalled a reciprocating shaft 50, to which the feed-block 46 is rigidly secured. Extending upwardly from the hub of 46 is an arm 51, bored to receive loosely the feed-rod 52, one end of which rod (52) is rigidly secured to the carriage 8, and the other end slidable in bearing 53 on the lathe bed.

Projecting outwardly from the arm 51 is a bifurcated portion 54, between the bifurcations of which is pivoted a swinging feed-link 55, over pin 56. Near the free end of 55 a hole is bored for an easy sliding fit over the feed-rod 52. Between the feed-link 55 and the vertical portion 51 is a spring 57 which normally tends to keep these two members (51 and 55) slightly apart. Also mounted within the bifurcated part 54 is a hand lever 58 with a right-angled portion 58′ normally out of contact with the feed-link 55. Between the shoulder of feed-block 46 and the bearing 47 is a helical spring 59, which surrounds the shaft 50. On the inner end of shaft 50 is an abutment arm 60 extending upwardly toward the feed-rod 52. Feed knock-out collar 61 is adjustably secured to feed-rod 52.

In action, the cam 44 forces the feed-block 46 toward the bearing 47, compressing the spring 59. Fig. 4 illustrates the extreme outward position of the feed-block. During this outward movement of the feed-block the feed-link 55 will be standing at a slight angle from perpendicular (as seen in Fig. 4) and the cramping action between the hole in 55 and the feed-rod 52 will make the link seize the bar and pull it along toward the bearing 53, the spring 57 assisting in keeping the lever 55 in the cramped or "dogged" position when on the feed stroke. While the roll 45 remains on the outer dwell of the cam 44 the parts remain as shown in Fig. 4, but on the return stroke of the feed-block 46 the feed-link 55 will be free to fall back against the vertical portion 51 and will then slip along the feed-rod freely.

When the cam recedes the spring 59 is the agent which returns the parts mounted on the shaft 50 to their extreme inward position, which is governed by the abutment arm 60 impinging on the adjusting screw 62. If the distance between 60, when in its extreme outward position, and the pointed end of 62 is less than the maximum throw of the cam 44, the roll 45 will be out of contact with the cam for a certain part of a revolution of the latter. This distance, above referred to, is the length of feed of the carriage in each cycle of the feed mechanism.

If it is desired to "throw out" the automatic feed mechanism, the hand lever 58 is raised to a vertical position (as seen in dot-and-dash lines, Figs. 4 and 8) at which time the portion 58' of the lever will jam the feed-link 55 hard over against the vertical part of feed-block, 51, and the axis of the hole in 51 will be in line with the axis of feed-rod 52, and any movement of the former, backward or forward will not impart movement to the latter.

It is necessary to stop further feeding of the carriage forward when the whole length of the dowel has been cut up and finish turned. To accomplish this the feed knock-out collar 61 is adjusted along the feed-rod 52 in the proper position, and on the forward movement of the carriage (toward the chuck) this collar will impinge on the abutment arm 60, forcing and holding the roll 45 to the extreme outward throw of the cam 44. It is also quite essential to prevent any movement of the carriage, in either direction, during the operation of finish-turning the dowels. In Figs. 4 and 5 I illustrate the parts and their relation to one another by which I am enabled to accomplish this object. Depending from the under side of the bed of the lathe is a bifurcated bearing 63, between the bifurcations of which is a rod 64, mounted over an eccentric pin 65 (see Fig. 10), the latter having an extended portion joining, through the coupling 66, with a rod 67 carried along the bed in bearings 63', and having mounted thereon, to be within easy reach of the operator, a handle 68. The outer end of the rod 64 is threaded and screws into one end of a turnbuckle nut 69. Extending out from the opposite end of the nut 69 is the remainder of what constitutes one link in a toggle joint combination. This part, 70, is also screw threaded, and of the opposite "hand" to the rod 64 and carries on its upper end a fork, within which is a roll 71 (see Fig. 6), journalled over pin 72 and swinging within the forks of another forked member 73, which has an upper end of arcuate form and partly surrounding the feed-rod 52, close to the bearing 53.

Mounted on the shaft 40 is a cam 74, engaging the roll 71 and during a certain period in each feed cycle,—as when the roll is in contact with the larger diameter dwell of the cam,—a strain is put on the ends of the toggle members, and as this pressure thrusts the feed-rod 52 rigidly against the bearing 53, a frictional lock obtains for the carriage feed,—remaining thus so long as the roll 71 remains on the larger dwell of the cam 74. This locking is synchronous with the finish-turning operation.

Immediately on the completion of the latter operation the cam 74 will have revolved sufficiently to have allowed the roll 71 to drop onto the smaller diameter dwell of the cam and relieve the pressure on the feed-rod, allowing the carriage to be moved another feed stroke. The unlocked position of the cam and toggle is shown in dot-and-dash lines, in Fig. 5.

When it is desired to make the automatic carriage-lock inoperative the hand lever 68 is depressed (see Fig. 5) and the eccentric pin will lower the bearing of rod 64 and thus move the arcuate end of forked member 73 slightly away from the feed-rod 52, preventing any further pressure on the feed-rod, until such time as the eccentric pin 65 is again lifted into lock-operative position. To obtain a fine adjustment of the parts affecting the pressure of the toggle on the feed-rod the turnbuckle nut 69 is available.

I may operate the lathe feed mechanism by any suitable power, and with any convenient arrangement of transmission units, but I have illustrated in my drawings a belt driven machine having a cone-pulley 75 mounted on a shaft 75' and receiving power from any available source; another set of cone-pulleys, 76, secured to the same shaft (75') connects by belt drive with still another set 77, the latter secured to and driving a shaft 78, on the outer end of which is a pinion 79 in mesh with a gear 80 rigidly secured to the shaft 40. A suitable clutch 81 allows of all feed mechanisms to be disconnected. Hand wheels 82, 82 offer means for operating the cam shafts manually when "setting up" for each individual job.

Having thus described my invention, what I claim is:

1. In a wood-turning lathe, the combination, with a head-stock rigidly mounted on the bed of said lathe, and a rotatable chuck-carrying spindle operating in bearings therein, of a tool-carrying carriage slidably mounted on said bed, a shaft rotatably mounted in bearings beneath and integral with said carriage, tool operating cams mounted on said shaft, a gear mounted on said shaft, a feed-rod with one end rigidly secured to said carriage, a reciprocating, non-rotatable, shaft moving in bearings in said bed, a feed-block rigidly secured to said reciprocating shaft, a feed-link pivotally hung from said feed-block and adapted to swing in a plane parallel to the direction of movement of said feed-rod, a hole bored in said feed-link at a spaced distance from the pivot point of same, said hole to encompass and be an easy sliding fit over said feed-rod, a drive shaft, a gear, of the same diameter as the first mentioned gear and having a key in the bore thereof, slidably mounted on said drive shaft, said key travelling in a key-way in said drive shaft and said gear meshing with said first mentioned gear and adapted to impart movement to cams mounted on said shaft in said carriage, and actuating means for rotating said drive shaft.

2. In a wood-turning lathe, comprising a bed member, a fixed head-stock, a rotatable chuck-carrying spindle and a slidably mounted tool-carrying carriage, the combination, with a feed-rod rigidly secured to said carriage, of means for frictionally gripping said feed-rod, actuating means for reciprocating said gripping means, means for releasing the grip of said gripping means when on the reverse stroke of feed reciprocating means, means for permanently throwing out of action said gripping means, and means for adjusting the travel of said reciprocating means whereby a greater or lesser amount of travel may be given to the carriage at each forward stroke of same.

3. In a wood-turning lathe, comprising a bed member, a fixed head-stock mounted on said bed, a rotatable chuck-carrying spindle rotating in said head-stock, a longitudinally movable tool and cam carrying carriage adapted to slide on the bed of said lathe, the combination, with a feed-rod fixed in said carriage, of frictional gripping means acting directly on said feed-rod, means for reciprocating said gripping means, means for varying the length of movement of said reciprocating means, means for locking the feed-rod against longitudinal movement during certain portions of each cycle of movement of the feeding mechanism, independent means for making inoperative said feeding mechanism, independent means for making inoperative the said locking means, and means for actuating said feeding and said locking means automatically and synchronously, substantially as described.

CHARLES F. POTTER.